United States Patent Office 2,772,894
Patented Dec. 4, 1956

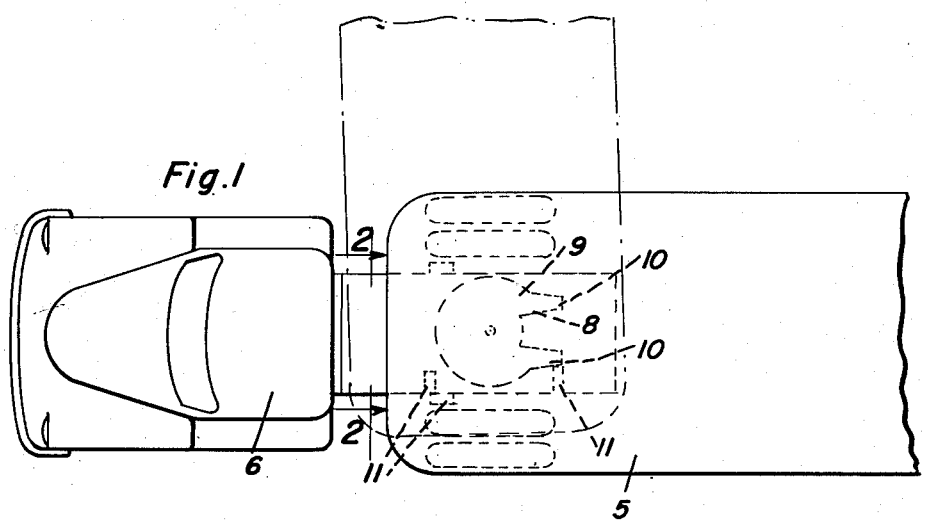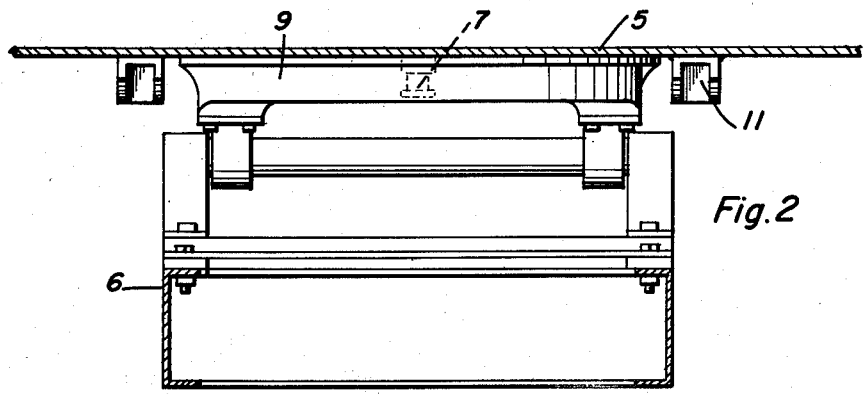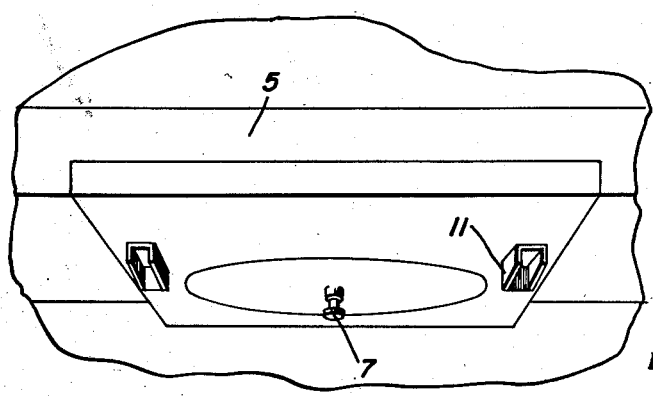

2,772,894

FIFTH WHEEL STOP FOR TRACTOR TRAILERS

William K. Oats, Claremore, Okla.

Application August 25, 1954, Serial No. 452,080

1 Claim. (Cl. 280—432)

The present invention relates to new and useful improvements in safety devices for tractor trailers to prevent the tractor cab from striking the trailer on short turns and also to reduce the danger of jack-knifing caused by the unrestricted swinging of the trailer to the said side of the tractor.

An important object of the invention is to equip the trailer with a stop adjacent the fifth wheel on which the trailer turns to limit swinging or jack-knifing movement thereof.

Another object is to provide a safety device for trailers of simple and practical construction, which is efficient and reliable in operation relatively inexpensive to manufacture and otherwise well adapted for the purpose for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top view;

Figure 2 is an enlarged fragmentary sectional view taken on a line 2—2 of Figure 1; and Figure 3 is a bottom perspective view of the fifth wheel connection for the trailer.

Referring now to the drawing in detail, wherein for the purpose of illustration I have disclosed a preferred embodiment of my invention, the numeral 5 designates a trailer coupled to a tractor 6 in a conventional manner, and including a pivot pin 7 at the underside of the trailer lockably engaged in the forked end 8 of a circular coupling plate 9 carried by the tractor and on which the trailer turns from side to side to provide a fifth wheel connecting between the tractor and trailer. The forked end 8 includes a pair of diverging guide arms 10 between which the pin 7 is guided into its locking position with the coupling plate.

In order to limit the turning movement of one part of the tractor trailer combination relative to the other, I provide the underside of the trailer with a pair of stop lugs 11 which are located at opposite sides of the coupling plate 9 of the tractor and adapted to engage an adjacent guide arm 10 upon a predetermined turning movement of the tractor, as shown by dotted lines in Figure 1 to prevent the cab of the tractor from striking the trailer, while the trailer is being manoeuvered and also to prevent the trailer and tractor from jack-knifing, while traveling.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is as follows:

A safety device for a tractor trailer combination including a forked fifth wheel coupling carried by the tractor for coupling with a pivot pin at the underside of the trailer, and a pair of stop lugs on the underside of the trailer and at substantially diametrically opposite sides of the pivot pin and engageable with opposite sides of the fork of the coupling to limit turning movement of one part of the tractor trailer combination relative to the other.

References Cited in the file of this patent

UNITED STATES PATENTS 2,146,145    Huffman _____ Feb. 7, 1939